United States Patent [19]

Kawane

[11] Patent Number: 4,637,617
[45] Date of Patent: Jan. 20, 1987

[54] DEVICE FOR FORCING PISTON RING RADIALLY OUTWARDLY

[75] Inventor: Minoru Kawane, Ishikawa, Japan

[73] Assignee: Ichikawajima-Harima Jukogyo Kabushiki Kaisha, Japan

[21] Appl. No.: 849,953

[22] Filed: Apr. 9, 1986

[30] Foreign Application Priority Data

Apr. 15, 1985 [JP] Japan ............... 60-54729[U]
Apr. 15, 1985 [JP] Japan ............... 60-54730[U]

[51] Int. Cl.$^4$ ................................ F16J 9/06
[52] U.S. Cl. .......................... 277/150; 277/151
[58] Field of Search ............... 277/138, 139, 149–151, 277/164

[56] References Cited

U.S. PATENT DOCUMENTS

| | | | |
|---|---|---|---|
| 350,004 | 9/1886 | Lang | 277/150 |
| 1,565,859 | 12/1925 | Litter | 277/150 |
| 2,036,632 | 4/1936 | Hepfinger | 277/150 |
| 2,076,310 | 4/1937 | White | 277/149 |
| 3,180,564 | 4/1965 | Fuhrmann et al. | 277/138 |
| 3,203,705 | 8/1965 | Doperalski | 277/150 |

Primary Examiner—Robert S. Ward

[57] ABSTRACT

A device for forcing a piston ring, which is a sealing member between the bore wall of a cylinder and the cylindrical outer surface of a piston, radially outwardly. The head of a plunger which forces the piston ring radially outwardly is semispherical and a sustantially conical hole for receiving therein the semispherical head of the plunger is formed in the inner peripheral surface of the piston ring in opposed relationship with the piston. Even when the axis of the plunger is misaligned when the center line or axis of the substantially conical hole, it can force the piston ring radially outwardly without producing any excessive force leading to the failure of the plunger and/or piston ring.

4 Claims, 7 Drawing Figures

DEVICE FOR FORCING PISTON RING RADIALLY OUTWARDLY

BACKGROUND OF THE INVENTION

The present invention relates to a device for forcing a piston ring radially outwardly and more particularly a device for forcing a piston ring radially outwardly adapted for use in a reciprocating compressor or with a piston valve reciprocating in a cylinder under the pressure of a gas or a driving valve in an air cylinder.

Generally, an oilless reciprocating compressor has a piston ring for compressing a gas. The piston ring is forced against the bore wall of a cylinder so as to minimize the leakage of the gas being compressed. Various methods have been devised and demonstrated for forcing a piston ring radially outwardly against the bore wall of a cylinder; one of them uses a plunger as shown in FIG. 5.

In FIG. 5, referece numeral 11 designates a cylinder; 12, a piston; 13, a radial hole of the piston 12; 14, a coiled spring; 15, a plunger loosely fitted in the radial hole 13 such that the coiled spring 14 is compressed; and 16, a piston ring loosely fitted into a circumferential piston ring groove of the piston 12. As shown in enlarged scale in FIG. 6, the plunger 15 comprises a rod 17 in the form of a hollow cylinder and a head 18 intergral with the radially outer end of the rod 17. A recess 19 for receiving the plunger head 18 is formed in the inner peripheral surface of the piston ring 16. More particularly, the coiled spring 14 is inserted into the plunger rod 17 and is compressed when the rod 17 is fitted into the radial hole 13 so that the plunger 15 is always pushed toward the cylinder 11. That is, the plunger head 18 is forced into the recess 19 so that the piston ring 16 is always made into intimate contact with the bore wall of the cylinder 11.

In the conventional device of the type described above with reference to FIGS. 5 and 6, the surface of contact between the plunger head 18 and the bottom of the recess 19 is flat. The head 18 and the recess 19 must be machined with a high degree of accuracy so as to avoid an offset or deviation due to misalignment.

In addition, there arises the problem that perpendicular between the surface of contact and the axis of the rod 17 must be maintained at a high degree of accuracy. That is, as shown in FIG. 7, when the axis of the plunger 15 is not aligned with the center line 20 of the recess 19, the piston ring 16 is damaged at portions indicated by A in FIG. 6 in the earlier stage of use or the joint B between the rod 17 and the head 18 is damaged in the earlier stage of use.

In addition, since the plunger head 18 is inserted into the recess 19 and is reciprocated in unison with the piston ring 16, there also arises the problem that the head 18 strikes the piston 12, leaving a dent in the piston wall.

SUMMARY OF THE INVENTION

The present invention was made to overcome the above and other problems encountered in the conventional devices for forcing a piston ring radially outwardly against the bore wall of a cylinder. The primary object of the present invention is therefore to provide a device for forcing a piston ring radially outwardly whose damage in the early stage of use due to the misalignment between the axis of a plunger and the center line of a recess on the piston ring can be prevented.

In order to attain the above and other objects, the present invention provides a device for forcing a piston ring radially outwardly wherein a spring and a plunger are accomodated in each hole on a piston so that reaction force of the spring forces the plunger to press the piston ring against a bore wall of a cylidner, comprising said plunger in the form of a rod and having a convex and semispherical head, and said piston having a substantially conical hole for receiving said head.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENT

Figure 1:
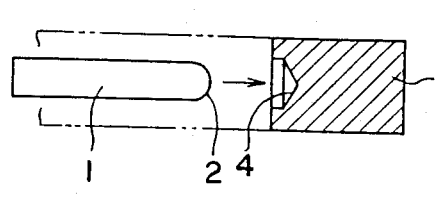
FIG. 1 is a fragmentary sectional view of a first embodiment of the present invention.

Referring first to FIG. 1 illustrating the first embodiment of the present invention, reference numeral 1 designates a plunger in the form of a single rod; 2, a semispherical convex head thereof; 3, piston ring; and 4, a substantially conical hole on the piston ring 3 into which is loosely fitted the semispherical head 2 of the plunger 1. That is, the surface of the plunger 1 which is made into contact with the piston ring 3 is convex and semispherical as indicated at 2 and the piston ring 3 has the substantially conical hole 4 adapted to receive the semispherical surface 2 of the plunger 1. In the case of a compression spring type, a coiled spring (not shown) is inserted into the plunger 1.

Figure 2:
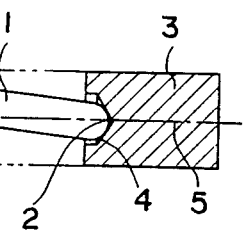
FIG. 2 is a view used to explain the mode of operation thereof when the axis of a plunger is misaligned relative to the axis of a substantially conical hole in a piston ring.

The abutment on the plunger 1 is semispherical and the receiving surface on the piston ring 3 is conical. Therefore, even when the axis of the plunger 1 is misaligned relative to the center line 5 as shown in FIG. 2, the semispherical head 2 of the plunger 1 is maintained in uniform contact with the conical surface of the hole 4 while the plunger 1 forces the piston ring 2 in the radially outward direction (right in FIG. 2). As a result, no eccentric load acts on the piston ring 3 and the contact between the plunger 1 and the piston ring 3 is maintained in a stable manner. In addition, since the semispherical head 2 of the plunger 1 is fitted into the substantially conical hole 4 of the piston ring 3, the plunger head 2 can be prevented from directly contacting the piston.

Figure 3:
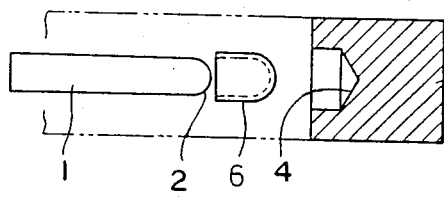
FIG. 3 is a fragmentary sectional view of a second embodiment of the present invention.
Figure 4:
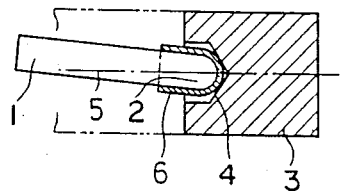
FIG. 4 is a view used to explain the mode of operation thereof when the axis of a plunger is misaligned relative to the axis of a substantially conical hole in a piston ring.
Figure 5:
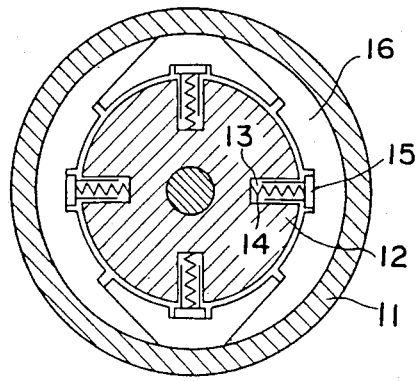
FIG. 5 is a sectional view of a piston and a cylinder employing a conventional device for forcing a piston ring radially outwardly against the bore wall of the cylinder.
Figure 6:
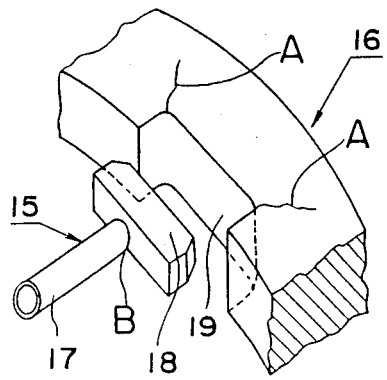
FIG. 6 is a perspective view, on enlarged scale, illustrating the relationship between the plunger and the piston ring in the conventional device shown in FIG. 5.
Figure 7:
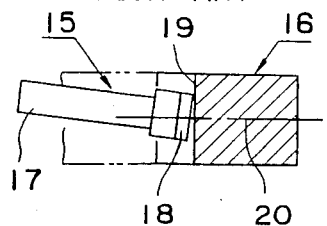
FIG. 7 is a view used to explain the mode of operation of the conventional device shown in FIG. 5.

Referring next to FIG. 3, a second embodiment of the present invention will be described. The second embodiment is substantially similar in construction to the first embodiment described in detail above with reference to FIG. 1 except that a cap 6 having a semispherical end is fitted over the semispherical head 2 of the plunger 1. The semispherical end of the cap 6 is inserted into the hole 4 of the piston ring 3 and pushes the piston ring 3 radially outwardly against the bore wall of the cylinder. The cap 6 is made of Teflon (registered trademark), a reinforced plastic, rubber or asbestos.

The second embodiment is advantageous over the first embodiment in that the plunger 1 does not directly push the piston ring. It is the cap that pushes the piston ring 3 so that even when the piston ring 3 is made of carbon or the like, it is prevented from being damaged.

In the second embodiment, the cap 6 is fitted as a cushion means over the semispherical head 2 of the plunger 1; but it is to be understood that it suffices that a cushion means is attached to the surface of the plunger 1 which is made into direct contact with the piston ring 3. Therefore, for instance, a cushion material may be coated over the plunger 1; the plunger 1 itself may be made of a cushion material; a cushion means may be embedded in the plunger 1; or a cushion means may be joined to the plunger 1 with an adhesive. Alternatively, a cushion means may be disposed within the substantially conical hole 4 of the piston ring 3.

As described above, according to the present invention, the plunger is in the form of a rod and its head is not enlarged, but is semispherical. The piston ring is provided only with the hole adapted to receive therein the semispherical head of the plunger. As a result, the fabrication and assembly of the component parts are much facilitated. Especially, the abutment of the plunger against the piston ring is convex and semispherical and is made into contact with the substantially conical surface of the hole of the piston ring. As a result, even when the axis of the plunger is offset from the center line or axis of the substantially conical hole of the piston ring, the uniform contact between the plunger and the piston ring can be maintained. Therefore, unlike the conventional devices, the plunger and the piston ring can be prevented from being damaged and no dent is formed on the piston. Moreover, it is not needed to fabricate the component parts with a high degree of accuracy.

Furthermore, according to the present invention, a cushion means is interposed between the abutments of the plunger and piston ring so that, unlike the conventional devices, the plunger and piston ring can be prevented from being damaged and no dent is formed on the piston.

What is claimed is:

1. A device for forcing a piston ring radially outwardly wherein a spring and a plunger are accomodated in each hole on a piston so that reaction force of the spring forces the plunger to press the piston ring against a bore wall of a cylinder, comprising said plunger in the form of a single rod and having a convex and semispherical head, and said piston ring having a substantially conical hole for receiving said head.

2. A device according to claim 1 wherein a cap is fitted over the head of said plunger.

3. A device according to claim 1 wherein said plunger is made of a cushion material at least at the head thereof.

4. A device according to claim 1 wherein a cushion material is disposed in said hole of said piston ring.

* * * * *